(12) United States Patent
Yashiro et al.

(10) Patent No.: US 7,214,250 B2
(45) Date of Patent: May 8, 2007

(54) LITHIUM SECONDARY CELL

(75) Inventors: Kazumasa Yashiro, Toyoake (JP);
Kenji Kawamura, Nagoya (JP);
Kenshin Kitoh, Nagoya (JP)

(73) Assignee: NGK Insulators, Ltd., Nagoya City (JP)

( * ) Notice: Subject to any disclaimer, the term of this patent is extended or adjusted under 35 U.S.C. 154(b) by 0 days.

(21) Appl. No.: 11/139,236

(22) Filed: May 27, 2005

(65) Prior Publication Data
US 2005/0246887 A1 Nov. 10, 2005

Related U.S. Application Data

(63) Continuation of application No. 10/083,323, filed on Feb. 26, 2002, now abandoned.

(30) Foreign Application Priority Data

| May 2, 2001 | (JP) | ............................. 2001-135425 |
| Dec. 27, 2001 | (JP) | ............................. 2001-398620 |

(51) Int. Cl.
*H01M 10/04* (2006.01)
*H01M 2/26* (2006.01)

(52) U.S. Cl. ..................... 29/623.4; 429/161

(58) Field of Classification Search ...................... None
See application file for complete search history.

(56) References Cited

U.S. PATENT DOCUMENTS

| 3,761,314 A | 9/1973 | Cailley |
| 5,972,532 A | 10/1999 | Oweis et al. |
| 6,010,801 A * | 1/2000 | Nakamaru et al. .......... 429/161 |
| 6,114,059 A | 9/2000 | Watanabe et al. |
| 6,328,769 B1 | 12/2001 | Oweis et al. |
| 2002/0164524 A1* | 11/2002 | Yashiro et al. ................ 429/94 |

FOREIGN PATENT DOCUMENTS

EP 0 973 214 1/2000

(Continued)

OTHER PUBLICATIONS

Kaushik Rajashekara: "Propulsion System Strategies for Fuel Cell Vehicles" SAE 2000 World Congress, 'Online!' Mar. 6, 2000 (pp. 1-9, XP002296865, Retrieved from Internet: URL:http://www.delphi.com/pdf/techpapers/2000-01-0369.pdf> 'retrieved on Sep. 20, 2004!, *p. 5, col. 2, paragraph 1*, *p. 6, col. 1, paragraph 2*.

*Primary Examiner*—Jonathan Crepeau
(74) *Attorney, Agent, or Firm*—Burr & Brown

(57) ABSTRACT

The invention provides a lithium secondary cell including an inner electrode body impregnated with a non-aqueous electrolyte, made up of a positive electrode and a negative electrode each made of at least one metallic foil wound or laminated together and collectors to lead out a current from this inner electrode body. The edges of the metallic foil of the positive electrode and/or the negative electrode and predetermined parts of the positive electrode collector and/or negative electrode collector are joined together to lead out a current from the inner electrode body. The edges of the metallic foil, the edges (joint edges) arranged to be joined to the predetermined parts of the positive electrode collector and/or the negative electrode collector and the predetermined parts of the positive electrode collector and/or the negative electrode collector are joined together. The lithium secondary cell has excellent productivity and space-saving capability.

32 Claims, 17 Drawing Sheets

FOREIGN PATENT DOCUMENTS

| | | |
|---|---|---|
| EP | 1 049 187 | 11/2000 |
| EP | 1 076 371 | 2/2001 |
| EP | 1 087 451 | 3/2001 |
| EP | 1 102 337 | 5/2001 |
| WO | 00/62356 | 10/2000 |

* cited by examiner

FIG.18(a)
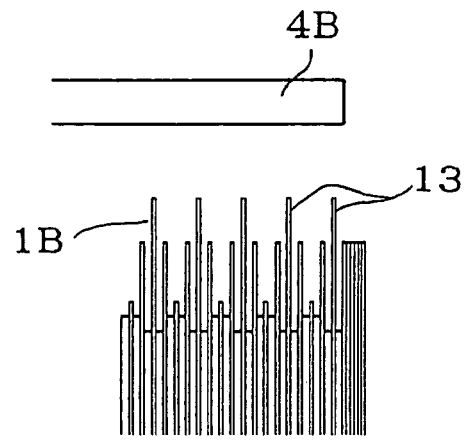
 
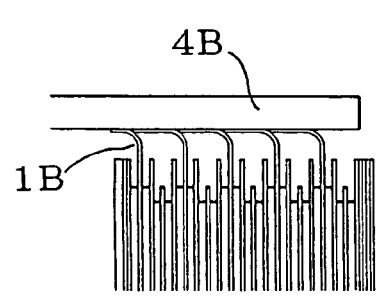
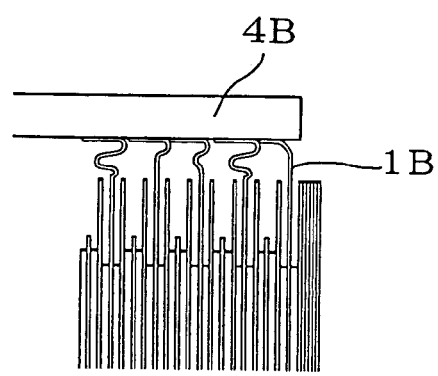
FIG.18(b)    FIG.18(c)

LITHIUM SECONDARY CELL

CROSS REFERENCE TO RELATED APPLICATION

This application is a Continuation of U.S. application Ser. No. 10/083,323 filed Feb. 26, 2002 now abandoned (the entirety of which is incorporated herein by reference) and claims the benefit of Japanese Application 2001-135,425, filed May 2, 2001 and Japanese Application 2001-398,620, filed Dec. 27, 2001.

BACKGROUND OF THE INVENTION AND RELATED ART STATEMENT

The present invention relates to a lithium secondary cell (hereinafter simply referred to as "cell"), and more particularly, to a lithium secondary cell with excellent productivity and space-saving capabilities.

The development of lithium secondary cells is underway as motor drive power supplies for electric cars and hybrid electric cars (hereinafter simply referred to, as "electric car, etc.") in response to a growing international demand for resource and energy savings to protect the global environment.

This lithium secondary cell contains an inner electrode body (hereinafter simply referred to as "electrode body") made up of a positive electrode and a negative electrode wound or laminated together with a separator made of a porous polymer film inserted in between so that the positive electrode and the negative electrode do not directly contact each other.

As shown in FIG. 20, a conventional wind type inner electrode body 61 is manufactured with a positive electrode 62 and negative electrode 63 wound with a separator 64 inserted in between, each provided with at least one collector tab 65 for the positive electrode and one collector tab 66 for the negative electrode (hereinafter referred to as "collector tabs 65 and 66"). Then, as shown in FIG. 19, the edges on the opposite side of the collector tabs 65 and 66 connected to the electrode plates 62 and 63 are attached to internal terminals 69A and 69B, etc. Reference numeral 76 denotes an elastic body (packing); 77, an insulation polymer film; 78, a pressure reducing valve; 79, a metallic foil.

Metallic foils, etc. are used for the electrode plates, such as aluminum, etc. for the positive electrode and copper or nickel for the negative electrode as collector substrates, and each electrode plate is formed by applying an electrode active material and the collector tabs are placed on at least one side of these collector substrates.

However, the collector tabs need to be attached to the electrode plates one by one, for example, by spot-welding, when the electrode body is wound, and the problem is that its process is complicated. Furthermore, at the edges on the opposite side connected to the electrode plates of the collector tabs, the plurality of collector tabs need to be bound and attached to the internal terminals by, for example, riveting, and therefore this process is also complicated and has a problem that it is not easy to connect the collector tabs while maintaining them at low resistance. Furthermore, there is another problem that connecting the electrode body and internal terminals using a plurality of collector tabs requires quite a large space.

SUMMARY OF THE INVENTION

The present invention has been implemented in view of the above-described conventional problems and it is an object of the present invention to provide a lithium secondary cell with excellent productivity and space-saving capabilities by adopting a configuration that each electrode plate and collector are directly joined to the current lead-out part from the inner electrode body to lead out a current. The present invention provides a lithium secondary cell comprising an inner electrode body impregnated with a non-aqueous electrolyte, made up of a positive electrode and a negative electrode each made of at least one metallic foil wound or laminated together. A positive electrode collector and a negative electrode collector are provided to lead out a current from the inner electrode body, characterized in that the edges of the metallic foils constituting the positive electrode and/or the negative electrode and predetermined parts of the positive electrode collector and negative electrode collector are joined together to lead out a current from the inner electrode body. That is, the edges of the above-described metallic foils are arranged edges (joint edges) to be joined to the above-described predetermined parts of the above-described positive electrode collector and/or the above-described negative electrode collector.

At this time, the present invention can also be constructed in such a way as to further comprise an electrode cover including internal terminals, external terminals and a cell cover, characterized in that the above-described positive electrode collector and/or the above-described negative electrode collector are connected to the above-described internal terminals using electrode leads.

Furthermore, the above-described collector can also serve as an electrode cover.

The present invention is preferably constructed in such a way that the joint edges of the metallic foil constituting the positive electrode (positive electrode metallic foil) and a joint having a joint surface at the edge that extends from the predetermined part of the positive electrode collector toward the joint edges are joined with the narrow end face of the joint edges facing the joint surface. The present invention is preferably constructed in such a way that the positive electrode metallic foil and the positive electrode collector are made of aluminum or an aluminum alloy and the predetermined part of the positive electrode collector is the edge of the positive electrode collector.

Furthermore, the present invention is preferably constructed in such a way that the joint edges of the metallic foil constituting the negative electrode (negative electrode metallic foil) and a joint having a joint surface at the edge that extends from the predetermined part of the negative electrode collector toward the joint edges are joined with the side near the joint edges adhered to the joint surface. The present invention is preferably constructed in such a way that the negative electrode metallic foil and the negative electrode collector are made of copper or a copper alloy and the side and the joint surface are closely contacted by bending the part near the joint edges. The present invention is preferably constructed in such a way that columnar crystals are formed from the metallic foil toward the negative electrode collector at the joint between the metallic foil and the negative electrode collector. The predetermined part of the negative electrode collector is preferably the edge of the negative electrode collector.

The joint between the joint edges of the positive electrode metallic foil and the predetermined part of the positive electrode collector (positive electrode joint) is preferably formed by irradiating a convex part protruding toward the joint edges formed on the predetermined part of the positive electrode collector with energy beams, melting the convex part of the positive electrode collector and welding the convex part of the positive electrode collector to the joint edges of the positive electrode metallic foil.

Furthermore, the present invention is preferably constructed in such a way that the joint between the joint edges of the negative electrode metallic foil and the predetermined part of the negative electrode collector (negative electrode joint) is formed by irradiating a convex part protruding toward the joint edge formed on the predetermined part of the negative electrode collector with energy beams, melting the convex part of the negative electrode collector and welding the convex part of the negative electrode collector to the joint edges of the negative electrode metallic foil.

The shape of the positive electrode collector and/or negative electrode collector is not limited to a particular shape, but it is preferably a cross-, Y- or I-figured tabular collector or a circular collector with partial notching.

The positive electrode collector and/or negative electrode collector is preferably formed to include a convex part and a flat part and the difference between the thickness ($L_2$) of the convex part and the thickness ($L_1$) of the flat part is 0.1 mm or more, the thickness of the flat part of the positive electrode collector is preferably 0.4 mm or more and the thickness of the convex part of the positive electrode collector is preferably 0.6 mm or more.

The present invention is preferably constructed in such a way that when the positive electrode joint is formed, the energy beam is irradiated onto the predetermined part at an angle θ (0°<θ≦90°) with respect to the normal to the plane including the narrow end face of the positive electrode metallic foil and when the positive electrode joint is formed, the power density of the energy beam at the irradiation point is 3 kW/mm² or more.

In the present invention, the thickness of the flat part of the negative electrode collector is preferably 0.2 mm or more and the thickness of the convex part of the negative electrode collector is preferably 0.4 mm or more.

The present invention is preferably constructed in such a way that when the negative electrode joint is formed, the energy beam is irradiated onto the predetermined part at an angle θ (0°<θ≦30°) with respect to the normal to the plane including the side of the negative electrode metallic foil and when the negative electrode joint is formed, the power density of the energy beam at the irradiation point is 6 kW/mm² or more.

When the negative electrode joint is formed, if the thickness of the convex part is $L_1$ (mm) and the power density is E (kW/mm²), it is preferable that the following Expression (2) be satisfied, that the irradiation point of the energy beam at the negative electrode collector be plane, and that the spot diameter of the irradiation point be 1 mm or less.

[Mathematical Expression 2]

$$L_1 \leq E/7 \quad (2)$$

The positive electrode collector is preferably placed in such a way that the convex part crosses the narrow end face at quasi-right angles. The energy beam is preferably irradiated onto the convex part of the positive electrode collector at quasi-right angles with respect to the line crossing the narrow end face at quasi-right angles.

The negative electrode collector is preferably placed in such a way that the convex part crosses the side of the negative electrode metallic foil at quasi-right angles. The energy beam is preferably irradiated onto the convex part of the negative electrode collector at quasi-right angles with respect to the line crossing the side of the negative electrode metallic foil at quasi-right angles.

The energy beam is preferably not directly irradiated onto the metallic foil. Neighboring metallic foils are preferably placed with a certain gap kept in between. Furthermore, the energy beam is preferably constituted by a laser or electron beam. Furthermore, the energy beam is preferably a continuous wave. The laser is preferably a YAG laser. A joint material for supporting the joint between the positive electrode collector and the positive electrode metallic foil is preferably applied to the predetermined part of the positive electrode metallic foil and/or the positive electrode collector or inserted between the positive electrode metallic foil and the positive electrode collector, and formed by irradiating the predetermined part of the positive electrode collector and the joint material with an energy beam and thereby melting the two and welding the melted predetermined part of the positive electrode collector and the joint material to the joint edges of the positive electrode metallic foil.

A joint material for supporting the joint between the negative electrode collector and the negative electrode metallic foil is preferably applied to the negative electrode metallic foil and/or the predetermined part of the negative electrode collector or inserted between the negative electrode metallic foil and the predetermined part of the negative electrode collector, and formed by irradiating the predetermined part of the negative electrode collector and the joint material with an energy beam and thereby melting the two and welding the melted predetermined part of the negative electrode collector and the joint material to the joint edges of the negative electrode metallic foil.

The present invention is preferably applicable to a cell having a capacity of 2 Ah or more and used to start an engine or to drive a motor of an electric car or hybrid electric car.

BRIEF DESCRIPTION OF THE DRAWINGS

FIGS. 18(*a*)–18(*c*) are schematic views illustrating another example of the method of bending the metallic foil.

DETAILED DESCRIPTION OF THE INVENTION

With reference now to the attached drawings, embodiments of the present invention will be explained below.

Figure 4:
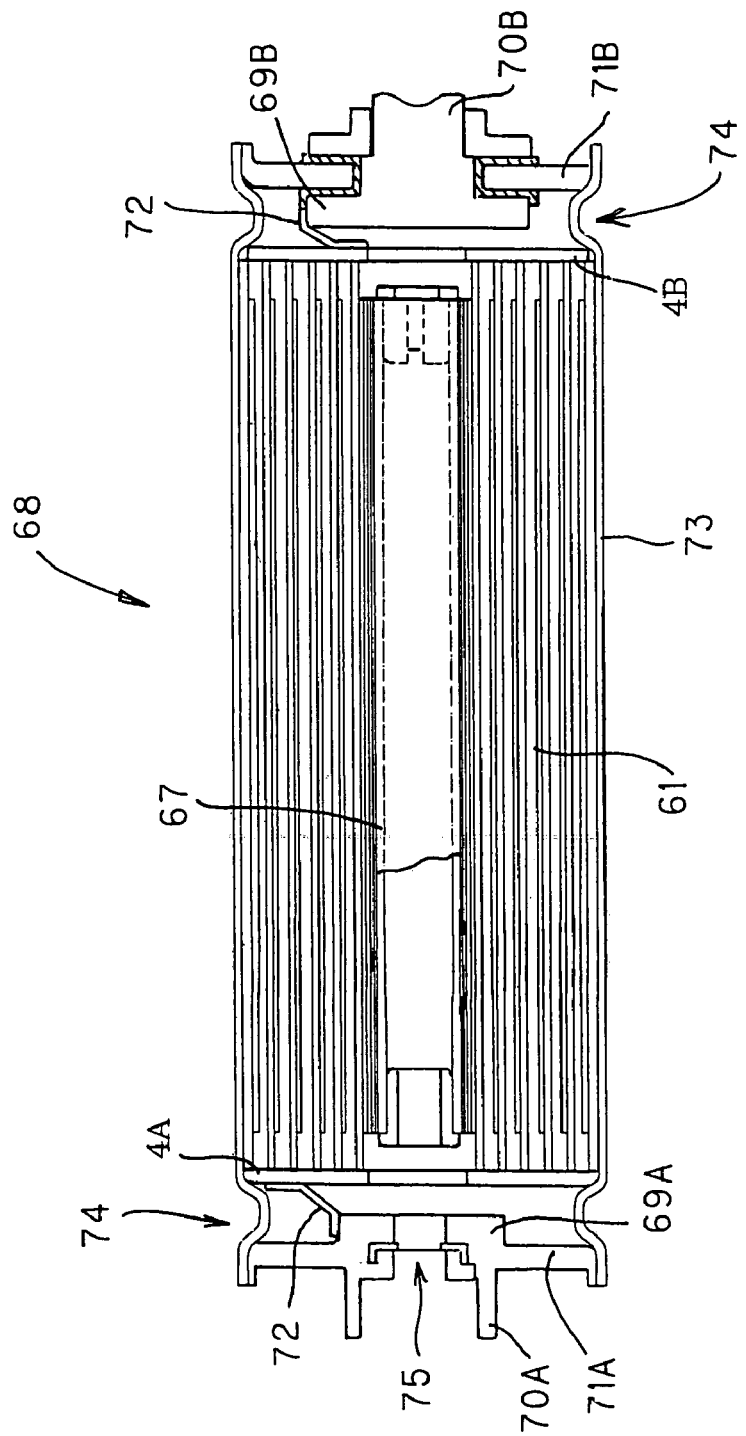
FIG. 4 is a sectional view showing an embodiment of the lithium secondary cell of the present invention.

As shown in FIG. 4, the lithium secondary cell of the present invention is a lithium secondary cell 68 comprising an inner electrode body (wind type inner electrode body 61) impregnated with a non-aqueous electrolyte, made up of a positive electrode and a negative electrode each made of at least one metallic foil wound or laminated, a positive electrode collector 4A and negative electrode collector 4B to lead out a current from this inner electrode body, characterized in that the edges of at least one metallic foil constituting the positive electrode and/or the negative electrode and predetermined parts of the positive electrode collector 4A and/or negative electrode collector 4B are joined together to lead out a current from the inner electrode body. Of the edges of the metallic foils, the arranged edges (joint edges) 15 are joined to the predetermined parts of the positive electrode collector 4A and/or the negative electrode collector 4B.

Figure 1:
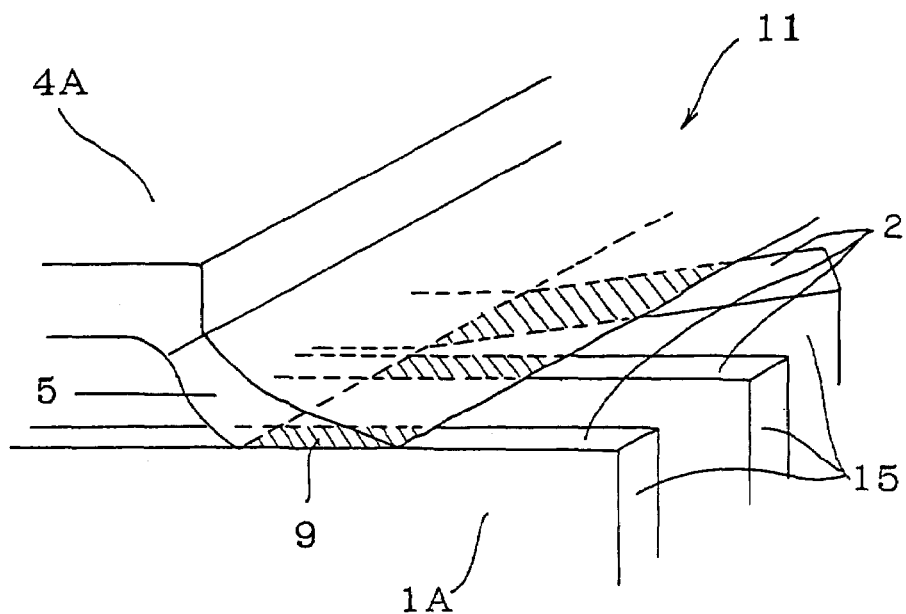
FIG. 1 is a perspective view schematically showing an example of a joint between a positive electrode metallic foil and positive electrode collector of a lithium secondary cell of the present invention.

Furthermore, FIG. 1 is a perspective view schematically showing an example of a joint between a positive electrode and positive electrode collector of the lithium secondary cell of the present invention and shows that the edges of at least one metallic foil (positive electrode metallic foil 1A) making up the positive electrode and a predetermined part of the positive electrode collector 4A are joined to lead out a current from the inner electrode body and further shows that the edges (joint edges) 15 arranged to be joined to the predetermined part of the positive electrode collector 4A of the edges of the metallic foil and the predetermined part of the positive electrode collector 4A are joined.

Figure 3:
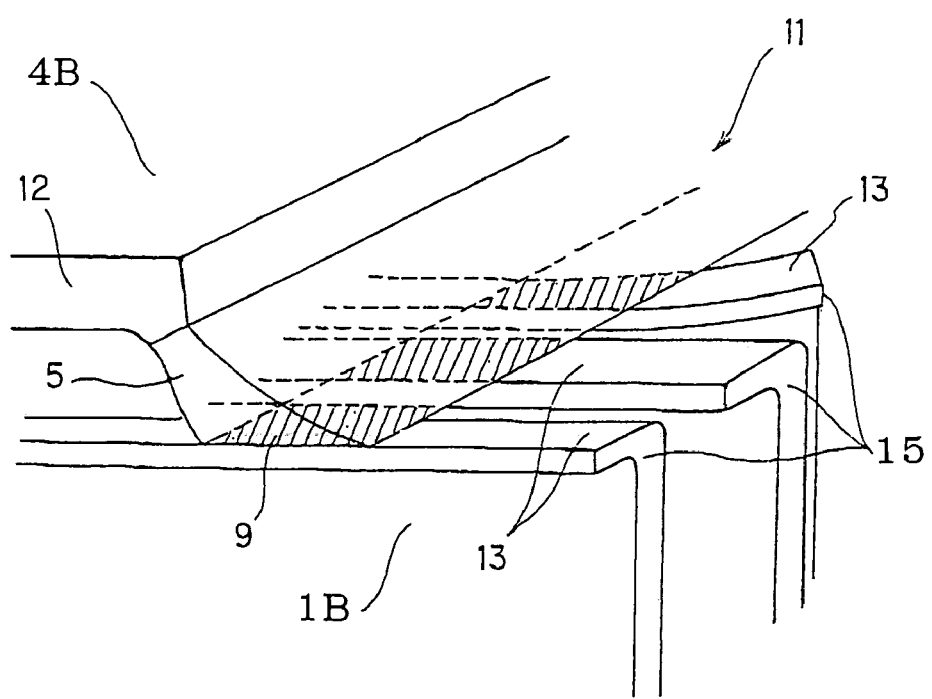
FIG. 3 is a perspective view schematically showing an example of a joint between a negative electrode metallic foil and negative electrode collector of the lithium secondary cell of the present invention.

Furthermore, FIG. 3 is a perspective view schematically showing an example of a joint between the negative electrode and negative electrode collector of the lithium secondary cell of the present invention and shows that the edges of at least one metallic foil (negative electrode metallic foil 1B) making up the negative electrode and a predetermined part of the negative electrode collector 4B are joined to lead out a current from the inner electrode body and further shows that the edges (joint edges) 15 arranged to be joined to the predetermined part of the negative electrode collector 4B of the edges of the metallic foil and the predetermined part of the negative electrode collector 4B are joined.

As shown in FIG. 4, in addition to the above-described configuration, the present invention can also have a configuration comprising an electrode cover provided with internal terminals 69A and 69B, external terminals 70A and 70B and cell covers 71A and 71B, with the positive electrode collector 4A and negative electrode collector 4B connected to the internal terminals 69A and 69B using their respective electrode leads 72. At this time, the electrode leads 72 are preferably made of a metal of the same type including its alloy as that of the collectors 4A and 4B connected and the internal terminals 69A and 69B. More specifically, if aluminum or an aluminum alloy is used for the positive electrode internal terminal 69A and positive electrode collector 4A, it is preferable that aluminum or an aluminum alloy be used for the positive electrode leads, and if copper or a copper alloy is used for the negative electrode internal terminal 69B and negative electrode collector 4B, it is preferable that copper or a copper alloy be used for the negative electrode leads.

The present invention can also be implemented by directly joining the collectors 4A and 4B with the internal terminals 69A and 69B to carry a current instead of using the electrode leads.

Furthermore, the present invention can also be implemented by using the current lead-out part of the present invention for the positive electrode and negative electrode or either of the two.

Figure 7:
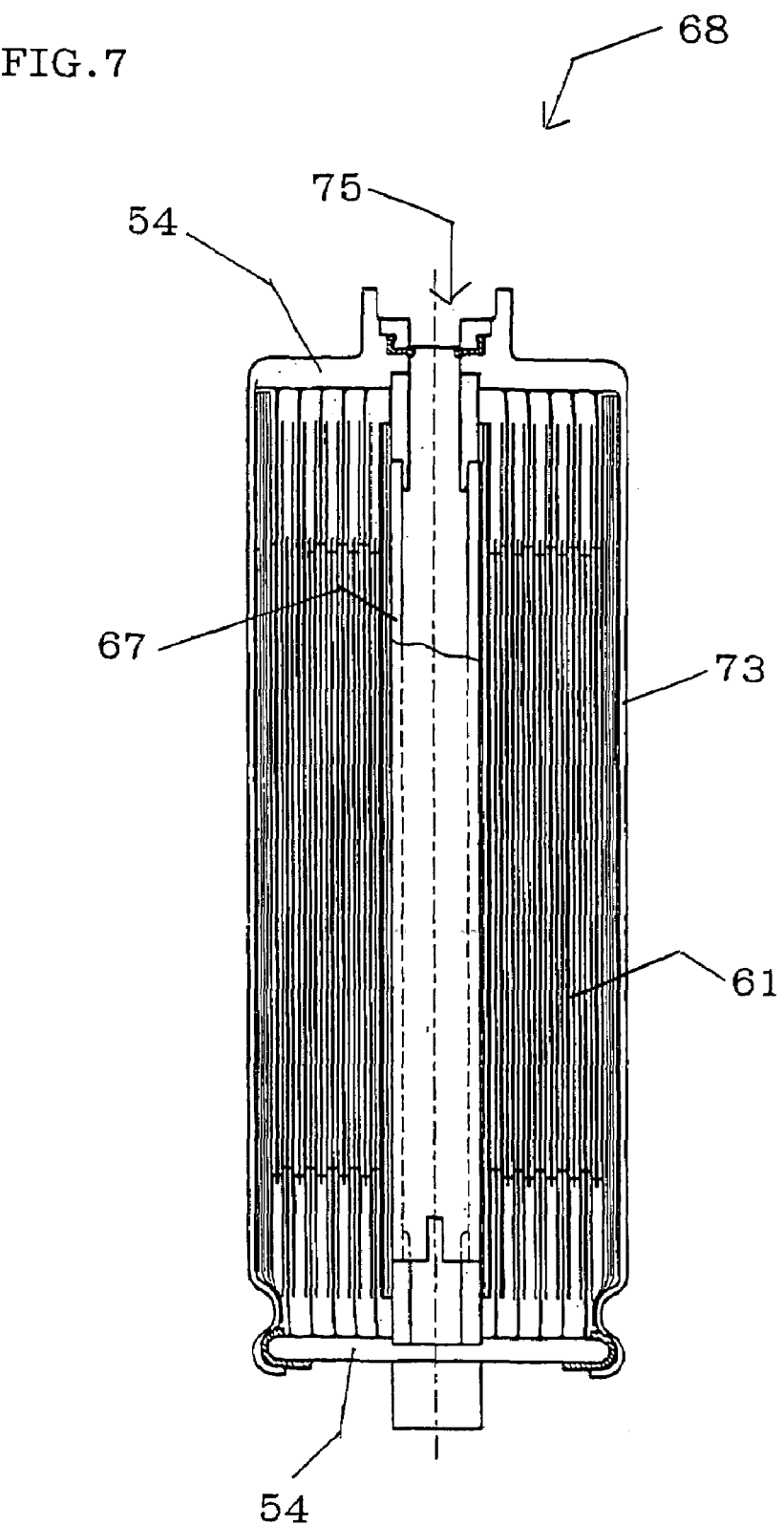
FIG. 7 is a sectional view showing another embodiment of the lithium secondary cell of the present invention.

Furthermore, in the present invention, the collector 54 can also serve as the electrode cover as shown in FIG. 7. FIG. 7 shows an example of a case of a cylindrical cell case 73 with one end left open and constriction processing applied to the other end. However, as far as the collector 54 also serves as the electrode cover, the shape of the cell is not limited to a particular one and both ends of the cell case 73 can either be subjected to constriction processing or left open. Furthermore, FIG. 7 shows an example of a case where a pressure reducing hole 75 is provided on the positive electrode side, but a pressure reducing hole 75 may also be provided on the negative electrode side.

As shown in FIG. 4 and FIG. 7, adopting a configuration that the electrode plates and the collectors 4A, 4B and 54 directly joined to the current lead-out part from the inner electrode body (wind type inner electrode body 61) to lead out a current eliminates the need to use the collector tabs which are the conventional current lead-out means and thereby eliminates the need for a complicated process for attaching collector tabs, thus improving productivity and at the same time saves the space corresponding to the length of the collector tab, thus improving the space-saving capability. The current lead-out part of the present invention is manufactured as described later, and therefore it is easier than attaching a plurality of collector tabs and more advantageous than the collector tabs in terms of space-saving. This will be described in further detail below.

Figure 8:
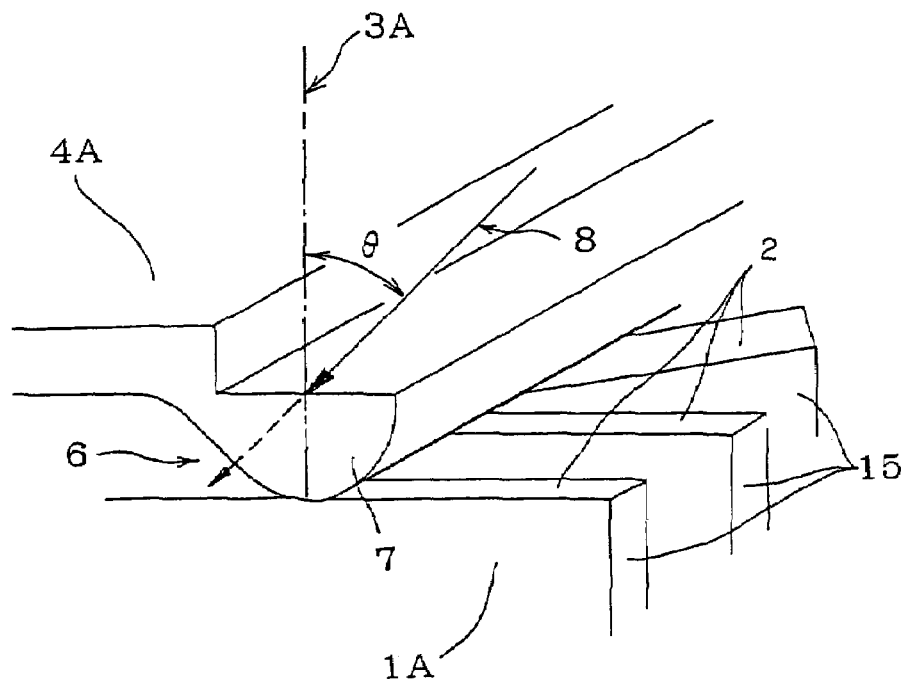
FIG. 8 is a perspective view schematically showing an example of an energy beam irradiation section of the positive electrode collector used for the lithium secondary cell of the present invention.

As shown in FIG. 1, it is preferable that the present invention be constructed in such a way that the joint edges of the positive electrode metallic foil 1A making up the positive electrode is joined to the joint 5 having a joint surface at the end, which extends from a predetermined part of the positive electrode collector 4A toward the joint edges 15, with the narrow end face 2 facing the joint surface. Aluminum or an aluminum alloy is preferably used as the metal material making up the positive electrode metallic foil 1A and the positive electrode collector 4A to be joined thereto from the standpoint that it displays an optimal characteristic as the component of the lithium secondary cell. Furthermore, as shown in FIG. 8, the joint (positive electrode joint) between the joint edges 15 of the positive electrode metallic foil 1A and the predetermined part of the positive electrode collector 4A is preferably formed by irradiating a convex part 7 protruding toward the joint edges 15 formed on the predetermined part of the positive electrode collector 4A with an energy beam 8, melting the convex part 7 of the positive electrode collector 4A and thereby welding the convex part 7 of the positive electrode collector 4A to the joint edges 15 of the positive electrode metallic foil 1A. Furthermore, it is preferable that the predetermined part of the positive electrode collector 4A be an edge 6 of the positive electrode collector 4A because this makes it easier to check the joint surface.

The following is an example of a method of forming the positive electrode joint of the lithium secondary cell of the present invention. That is, as shown in FIG. 8, this method consists of forming a joint body between the positive electrode metallic foil 1A and the positive electrode collector 4A by placing the positive electrode collector 4A having the convex part 7 protruding toward the predetermined part of the edges (joint edges) 15, which are arranged to be joined to the positive electrode collector 4A of the edges of the positive electrode metallic foil 1A in such a way that the convex part 7 has contact with or comes close to at least one of the narrow end faces 2. The convex part 7 of the positive electrode collector 4A is irradiated with the energy beam 8 and melted, and the melted convex part 7 of the positive electrode collector 4A is welded to the joint edges 15 of the positive electrode metallic foil 1A.

Furthermore, the shape of the convex part 7 protruding toward the joint edges 15 of the positive electrode metallic foil 1A on the predetermined part of the positive electrode collector 4A is not limited to a particular one, but it is preferable that the shape of the convex part 7 secure the contact between the convex surface of the convex part 7 and the narrow end face 2 of the positive electrode metallic foil 1A so as to facilitate the welding of the joint edge 15 of the positive electrode metallic foil 1A and the positive electrode collector 4A and a preferable example can include a case where the convex surface of the convex part 7 and the narrow end face 2 of the positive electrode metallic foil 1A are formed in such a way as to have point contact with each other.

Figure 15:
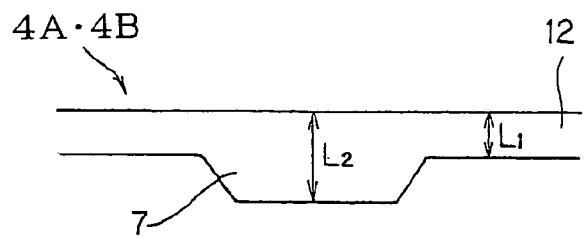
FIG. 15 is a schematic view showing an example of the shape of a convex part of the collector used for the lithium secondary cell of the present invention.
Figure 16:
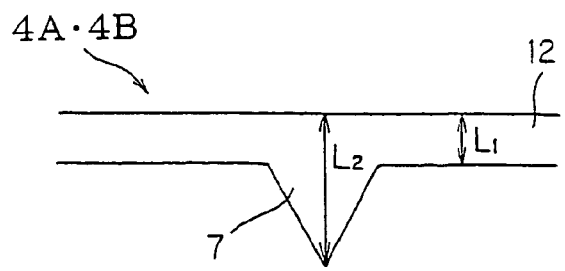
FIG. 16 is a schematic view showing another example of the shape of the convex part of the collector used for the lithium secondary cell of the present invention.

FIG. 15 and FIG. 16 show specific examples of the shape of the convex part of the collector. The shape of the convex part 7 of the positive electrode collector 4A and the negative electrode collector 4B (described later) can be either a trapezoidal shape as shown in FIG. 15 or a spire-like shape as shown in FIG. 16.

In FIG. 15 and FIG. 16, $L_1$ denotes the thickness of the flat part 12 and $L_2$ denotes the thickness of the convex part 7.

In the lithium secondary cell of the present invention, as shown in FIG. 15 and FIG. 16, it is preferable that the positive electrode collector 4A be constructed of the convex part 7 and other flat part 12, the difference between the thickness ($L_2$) of the convex part 7 and the thickness ($L_1$) of the flat part 12 be 0.1 mm or more, more preferably 0.6 mm or more and most preferably 0.8 mm or more. In the case where the difference in thickness between the convex part 7 and flat part 12 is less than 0.1 mm, it is impossible to take advantage of the feature in, the shape of the convex part 7 and not desirable because the contact between the convex part 7 and the positive electrode metallic foil 1A becomes unstable. The upper limit of the difference in thickness between the convex part 7 and flat part 12 in the present invention is not limited to a particular one, but can be set according to the processing accuracy and strength, etc. of the positive electrode collector as appropriate, for example, 3 mm or less.

When the positive electrode collector is pressed against the positive electrode metallic foil to join the two together, it is preferable from the standpoint of preventing deformation or damage, etc. of the positive electrode collector that the thickness ($L_1$) of the flat part of the positive electrode collector 4A be 0.4 mm or more, more preferably 0.5 mm or more and most preferably 0.6 mm or more. The upper limit of the thickness of the flat part is not limited to a particular one, but can be set according to the strength and weight, etc. of the positive electrode collector as appropriate, for example, 2 mm or less because it is the part not directly related to the welded part.

Furthermore, it is preferable that the thickness ($L_2$) of the convex part of the positive electrode collector 4A be 0.6 mm or more, more preferably 0.7 mm or more and most preferably 0.8 mm or more. This strengthens the joint between the positive electrode collector and the positive electrode metallic foil. The upper limit of the thickness of the convex part is not limited to a particular one, but can be set according to the limit of irradiation power of the energy beam, etc. as appropriate.

The following shapes can be included in preferable examples of the shape of the energy beam irradiation section of the positive electrode collector used for the lithium secondary cell of the present invention.

FIG. 8 shows an example of the positive electrode collector 4A having the convex part 7 at the edge 6. In this case, by irradiating the energy beam 8 from the upper surface of the positive electrode collector 4A, it is possible to join the positive electrode collector 4A and joint edges 15 of the positive electrode metallic foil 1A by welding.

Figure 10:
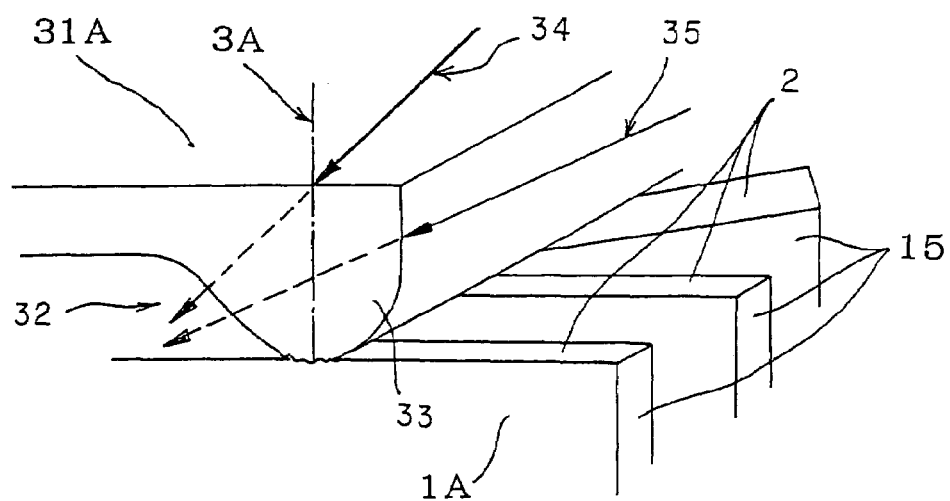
FIG. 10 is a perspective view schematically showing another example of the energy beam irradiation section of the positive electrode collector used for the lithium secondary cell of the present invention.

FIG. 10 shows an example of the positive electrode collector 31A having the convex part 33 thicker than that of the positive electrode collector 4A in the FIG. 8. In this case, in addition to irradiating the energy beam 34 from the upper surface of the positive electrode collector 31A, it is also possible to irradiate an energy beam 35 onto the side of the convex part 33 to join the positive electrode collector 31A and the joint edges 15 of the positive electrode metallic foil 1A by welding.

Figure 11:
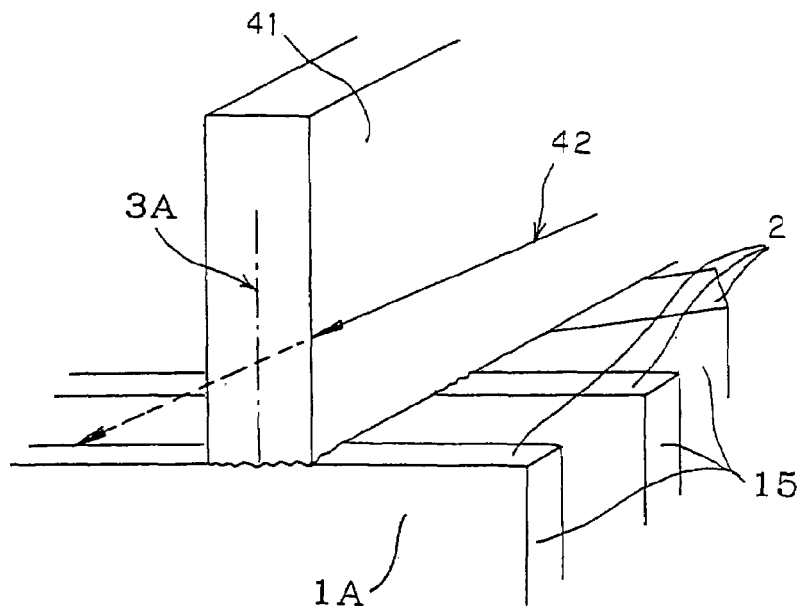
FIG. 11 is a perspective view schematically showing a further example of the energy beam irradiation section of the positive electrode collector used for the lithium secondary cell of the present invention.

FIG. 11 shows an example of a case where a tabular positive electrode collector 41 is placed in such a way that its end face contacts the joint edges 15 of the positive electrode metallic foil 1A. In this case, it is also possible to irradiate an energy beam 42 from the side of the positive electrode collector 41 to join the positive electrode collector 41 and the joint edges 15 of the positive electrode metallic foil 1A by welding. Thus, as shown in FIG. 11, the lithium secondary cell of the present invention can also be manufactured by joining the positive electrode collector 41 without the convex part and a plurality of positive electrode metallic foils 1A.

Figure 12:
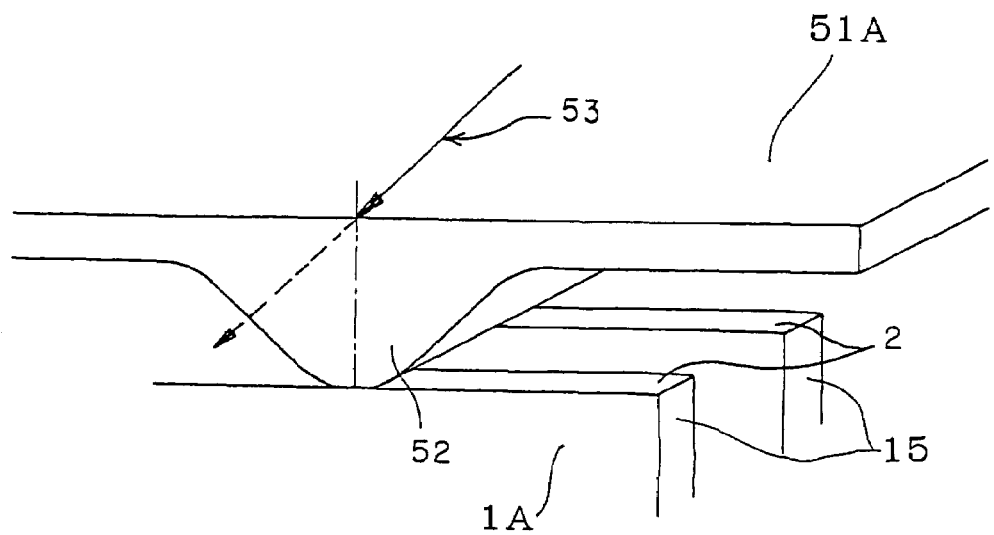
FIG. 12 is a perspective view schematically showing a still further example of the energy beam irradiation section of the positive electrode collector used for the lithium secondary cell of the present invention.

FIG. 12 shows an example of a case where a convex part 52 is provided on a predetermined part except the edge of a positive electrode collector 51A. In this case, it is possible to irradiate an energy beam 53 onto the back of the positive electrode collector 51A with a convex part 52 to join the positive electrode collector 51A and the positive electrode metallic foil 1A.

Figure 9:
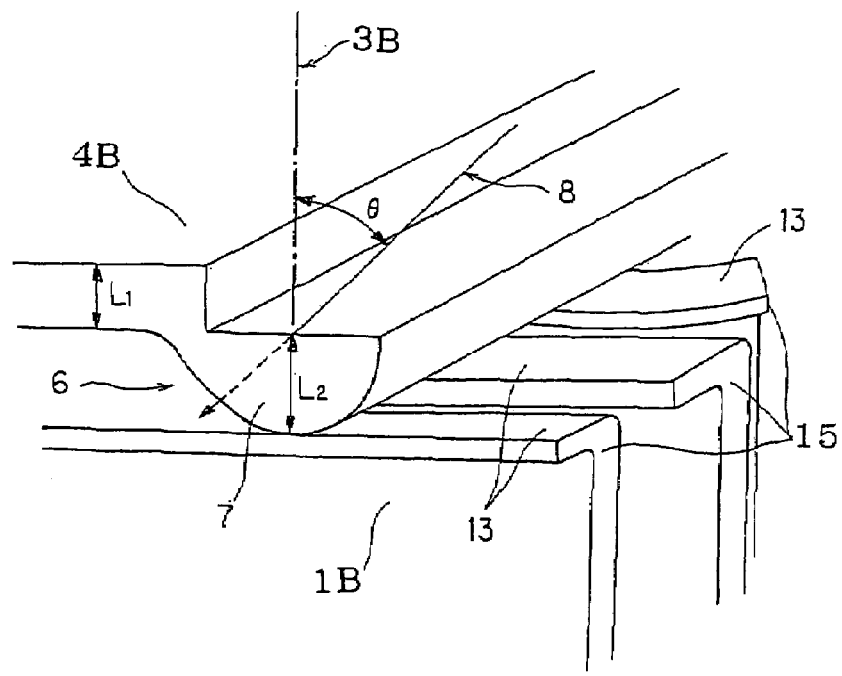
FIG. 9 is a perspective view schematically showing an example of an energy beam irradiation section of the negative electrode collector used for the lithium secondary cell of the present invention.

On the other hand, as shown in FIG. 3, in the present invention, it is preferable to join the joint edges 15 of the negative electrode metallic foil 1B that constitutes the negative electrode and the joint 5 having the joint surface at its end which extends from the predetermined part of the negative electrode collector 4B toward the joint edges 15 by closely contacting the side 13 near the joint edges 15 with the joint surface, and it is preferable to use copper or a copper alloy as the metal material constituting the negative electrode metallic foil 1B and the negative electrode collector 4B to be joined thereto from the standpoint of making it display an optimal characteristic as the component of the lithium secondary cell. Furthermore, as shown in FIG. 9, it is also preferable that the joint (negative joint) between the joint edges 15 of the negative electrode metallic foil 1B and the predetermined part of the negative electrode collector 4B be formed by irradiating the energy beam 8 onto the convex part 7 protruding toward the joint edges 15 formed on the predetermined part of the negative electrode collector 4B, thereby melting the convex part 7 of the negative electrode collector 4B and welding the convex part 7 of the negative electrode collector 4B and the joint edges 15 of the negative electrode metallic foil 1. Furthermore, it is also preferable that the predetermined part of the negative electrode collector 4B be the edge 6 of the negative electrode collector 4B from the standpoint of the ease of checking of the joint surface.

Examples of the method of joining the negative electrode metallic foil and the negative electrode collector of the lithium secondary cell of the present invention include the following methods. That is, as shown in FIG. 9, it is possible to join the negative electrode metallic foil 1B and the negative electrode collector 4B by placing the negative electrode collector 4B provided on the predetermined part of the convex part 7 protruding toward the edges (joint edges) 15 arranged to be joined to the negative electrode collector 4B of the edges of the negative electrode metallic foil 4B in such a way that the convex part 7 closely contacts the side 13 near at least one of the joint edges 15, irradiating the energy beam 8 onto the convex part 7 of the negative electrode collector 4B, melting the convex part 7, welding the melted convex part 7 of the negative electrode collector 4B to the joint edges 15 of the negative electrode metallic foil 1B.

Figure 17A:
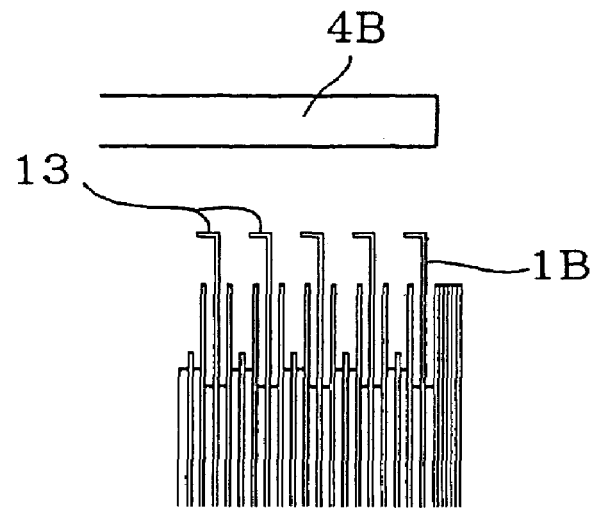
FIG. 17(*a*) and FIG. 17(*b*) are schematic views showing an example of a method of bending the metallic foil.
Figure 17B:
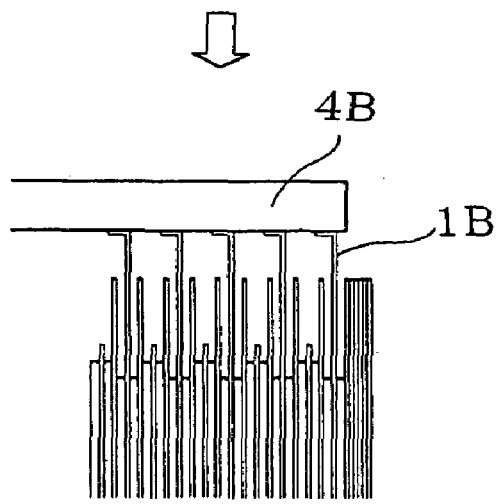
Figure 19:
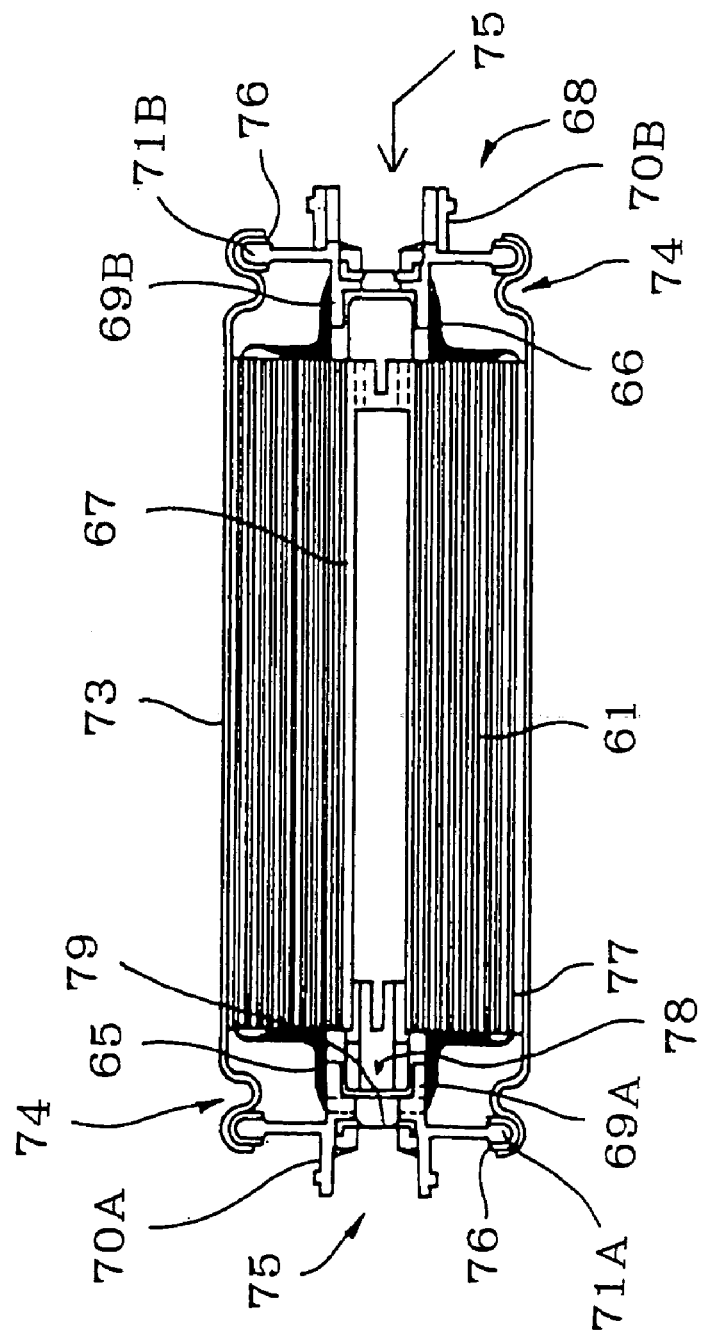
FIG. 19 is a sectional view showing an embodiment of a conventional lithium secondary cell.
Figure 20:
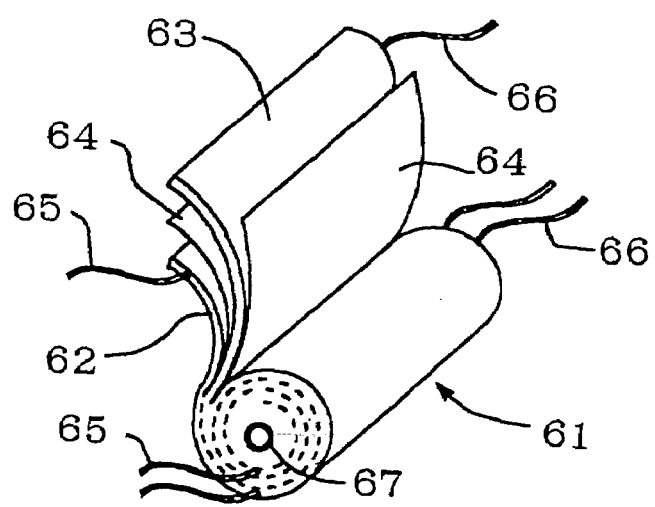
FIG. 20 is a perspective view showing an example of a wind type inner electrode body.
Figure 21:
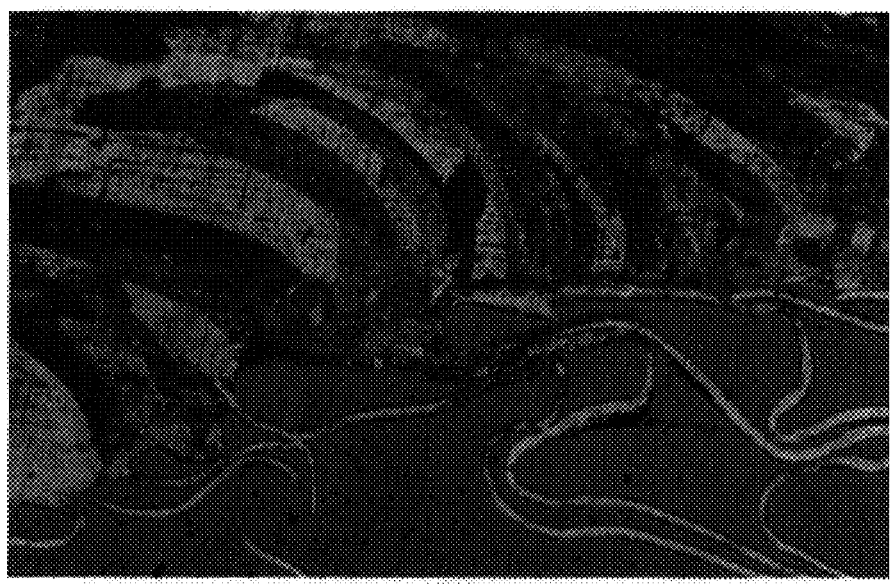
FIG. 21 is a microphotograph showing a metal organization of a section of a joint body in Embodiment 1.
Figure 22:
FIG. 22 is a microphotograph showing a metal organization of a section of a joint body in Embodiment 2.
Figure 23:
FIG. 23 is a microphotograph showing a metal organization of a section of a joint body in Embodiment 3.
Figure 24:
FIG. 24 is a microphotograph showing a metal organization of a section of a joint body in comparative example 1.
Figure 25:
FIG. 25 is a microphotograph showing a metal organization of a section of a joint body in comparative example 2.

At this time, it is possible to adhere the side 13 to the convex part 7 which is the joint surface by bending the area close to the joint edges 15. The methods of closely contacting the side 13 with the convex part 7 by bending the area close to the joint edges 15 include a method as shown in FIG. 17 whereby the area close to the joint edges 15 is bent beforehand using an appropriate method (FIG. 17A), then placing the negative electrode collector 4B on the side 13 (FIG. 17B) or a method as shown in FIG. 18 whereby the negative electrode collector 4B to be joined to the joint edges is pressed with an appropriate pressure, bent and adhered (FIGS. 18B and 18C), etc.

In the lithium secondary cell of the present invention, it is preferable that columnar crystals be formed from the negative electrode metallic foil toward the negative electrode collector at the joint between the negative electrode metallic foil and the negative electrode collector. Generally, a welded metal grows (epitaxial growth) on crystal grains of the base material (unwelded part) in the same crystal orientation. The solid phase formed in this way grows toward the inside of the welded bead (welded part) as the heat source moves. This growth tends to continue in the direction with the maximum temperature gradient and the crystal grows almost extending in one such direction and the crystal grown in this way is called "columnar crystal".

The melted part of the negative electrode collector is recrystallized as it is cooled down and the heat of the melted part spreads rapidly through the negative electrode metallic foil. That is, the temperature of the melted metal corresponding to the part adhered to the negative electrode metallic foil decreases and the columnar crystals are formed more easily from the negative electrode metallic foil toward the negative electrode collector with the interface between the negative electrode metallic foil and melted metal as the core. Furthermore, in the present invention, the side near the joint edges of the negative electrode metallic foil has close contact with the negative electrode collector without any gaps, providing an optimal contact condition, and therefore the columnar crystals are easily formed with the cooling effect through the negative electrode metallic foil. The lithium secondary cell of the present invention in which columnar crystals are formed on the joint from the negative electrode metallic foil toward the negative electrode collector is a lithium secondary cell providing an optimal state of joint between the negative electrode metallic foil and the negative electrode collector, that is, excellent mechanical strength and reliability.

The shape of the convex part provided on the predetermined part of the negative electrode metallic part used in the lithium secondary cell of the present invention is not limited to a particular one.

Here, FIG. 15 and FIG. 16 show specific examples of the shape of the convex part. The shape of the convex part 7 of the negative electrode collector 4B used in the lithium secondary cell of the present invention can be a trapezoidal shape as shown in FIG. 15 or a spire-like shape as shown in FIG. 16.

In the lithium secondary cell of the present invention, as shown in FIG. 15 and FIG. 16, the negative electrode collector 4B is formed of the convex part 7 and other flat part 12 and the difference between the thickness ($L_2$) of the convex part 7 and the thickness ($L_1$) of the flat part 12 is preferably 0.1 mm or more, more preferably 0.6 mm or more and most preferably 0.8 mm or more. In the case where the difference in thickness between the convex part 7 and flat part 12 is less than 0.1 mm, it is impossible to take advantage of the feature in the shape of the convex part 7 and it is not desirable because the contact between the convex part 7 and the negative electrode metallic foil 1B becomes unstable. Furthermore, the upper limit of the difference in thickness between the convex part 7 and flat part 12 of the negative electrode collector 4B is not limited to a particular one, but can be set according to the processing accuracy and strength, etc. of the negative electrode collector as appropriate, for example, 3 mm or less.

When the negative electrode collector is pressed against the negative electrode metallic foil to join the two, it is preferable from the standpoint of preventing deformation or damage, etc. of the negative electrode collector that the thickness ($L_1$) of the flat part be 0.2 mm or more, more preferably 0.3 mm or more and most preferably 0.4 mm or more. The upper limit of the thickness of the flat part is not limited to a particular one, but can be set according to the strength and weight, etc. of the negative electrode collector as appropriate, for example, 2 mm or less because it is the part not directly related to the welded part.

Furthermore, it is preferable that the thickness ($L_2$) of the convex part of the negative electrode collector 4B be 0.4 mm or more, more preferably 0.5 mm or more and most preferably 0.6 mm or more. This strengthens the joint between the negative electrode collector and negative electrode metallic foil. The upper limit of the thickness of the convex part is not limited to a particular one, but can be set according to the limit of irradiation power of the energy beam, etc. as appropriate.

The following are preferable examples of the shape of the energy beam irradiation section of the negative electrode collector used for the lithium secondary cell of the present invention.

FIG. 9 shows an example of the negative electrode collector 4B having the convex part 7 at the edge 6. In this case, by irradiating the energy beam 8 from the upper surface of the negative electrode collector 4B, it is possible to join the negative electrode collector 4B and joint edges 15 of the negative electrode metallic foil 1B by welding.

Figure 13:
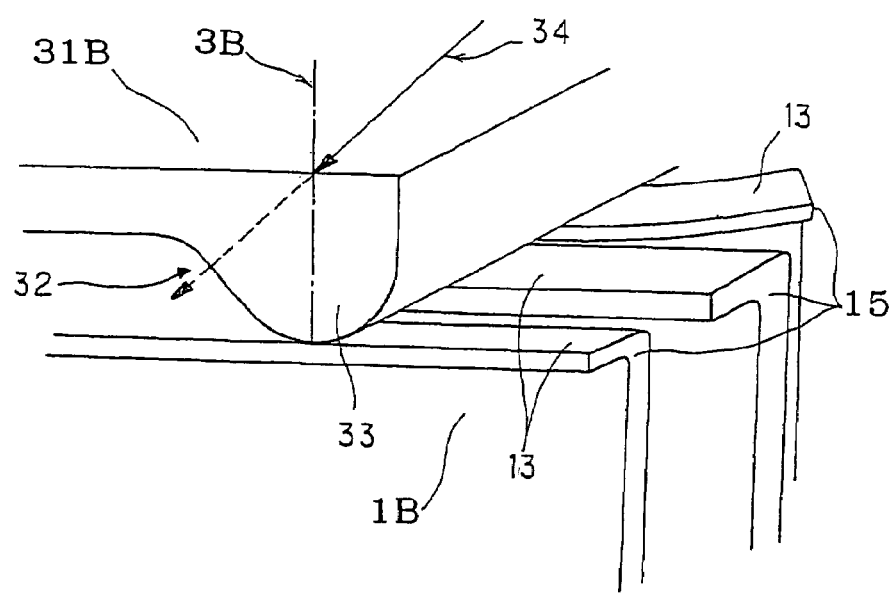
FIG. 13 is a perspective view schematically showing another example of the energy beam irradiation section of the negative electrode collector used for the lithium secondary cell of the present invention.

FIG. 13 shows an example of the negative electrode collector 31B having the convex part 33 thicker than that of the negative electrode collector 4B in FIG. 9. In this case, it is possible to irradiate an energy beam 34 from the upper surface of the negative electrode collector 31B and join the negative electrode collector 31B and the joint edges 15 of the negative electrode metallic foil 1B by welding.

Figure 14:
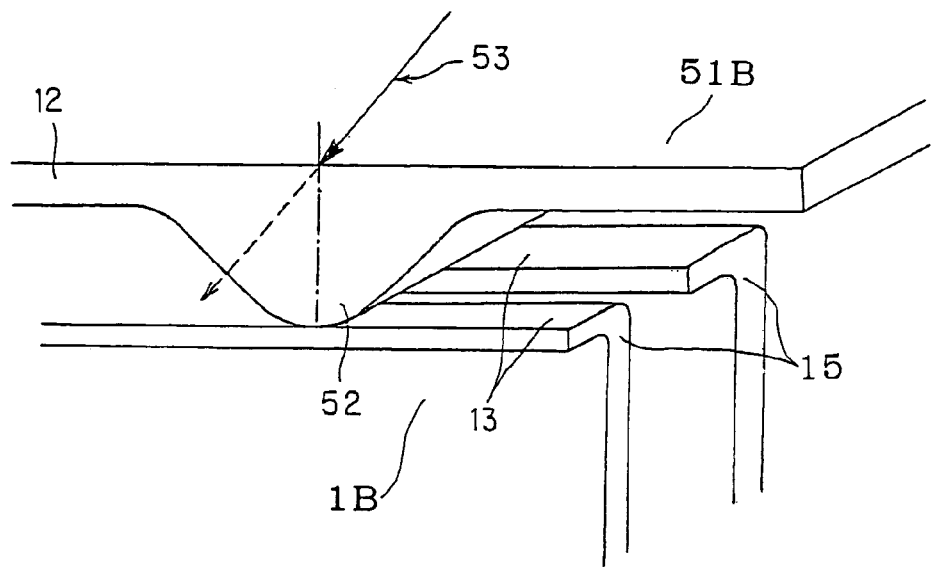
FIG. 14 is a perspective view schematically showing a further example of the energy beam irradiation section of the negative electrode collector used for the lithium secondary cell of the present invention.

FIG. 14 shows an example of a case where a convex part 52 is provided on a predetermined part which is not the edge of the negative electrode collector 51B. In this case, it is possible to irradiate an energy beam 53 onto the back of the negative electrode collector 51B provided with the convex part 52 to join the negative electrode collector 51B and the negative electrode metallic foil 1B.

When aluminum or an aluminum alloy is used for the positive electrode collector and positive electrode metallic foil and copper or a copper alloy is used for the negative electrode collector and negative electrode metallic foil, the metallic foil and collector are made of the same type of metal in the present invention, and therefore it is possible to join the metallic foil and the collector better and increase the mechanical strength of the current lead-out section. In this case, it is preferable that the thickness of the positive electrode metallic foil made of aluminum or an aluminum alloy be 15 µm to 25 µm and the thickness of the negative electrode metallic foil made of copper or a copper alloy be 7 µm to 15 µm. In the case of the cells shown in FIG. 4 and FIG. 7, an aluminum foil having a thickness of 20 µm and a copper foil having a thickness of 10 µm are used.

Figure 5:
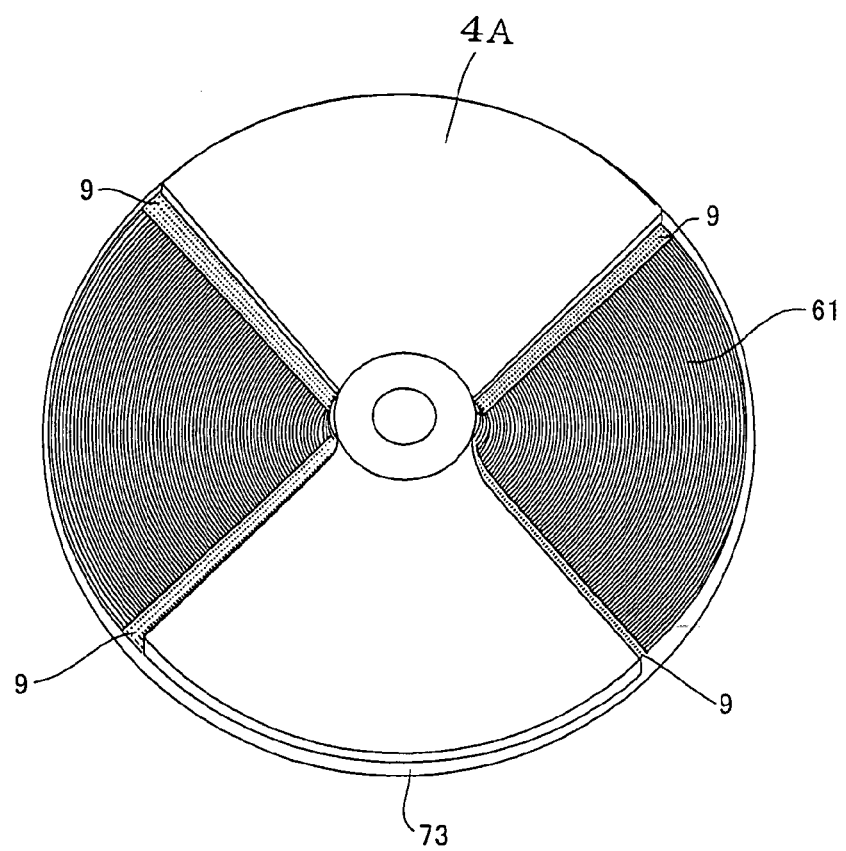
FIG. 5 is a replica diagram of a photo showing an example of a current lead-out part where a wind type electrode body and positive electrode collector of the lithium secondary cell of the present invention are joined.
Figure 6:
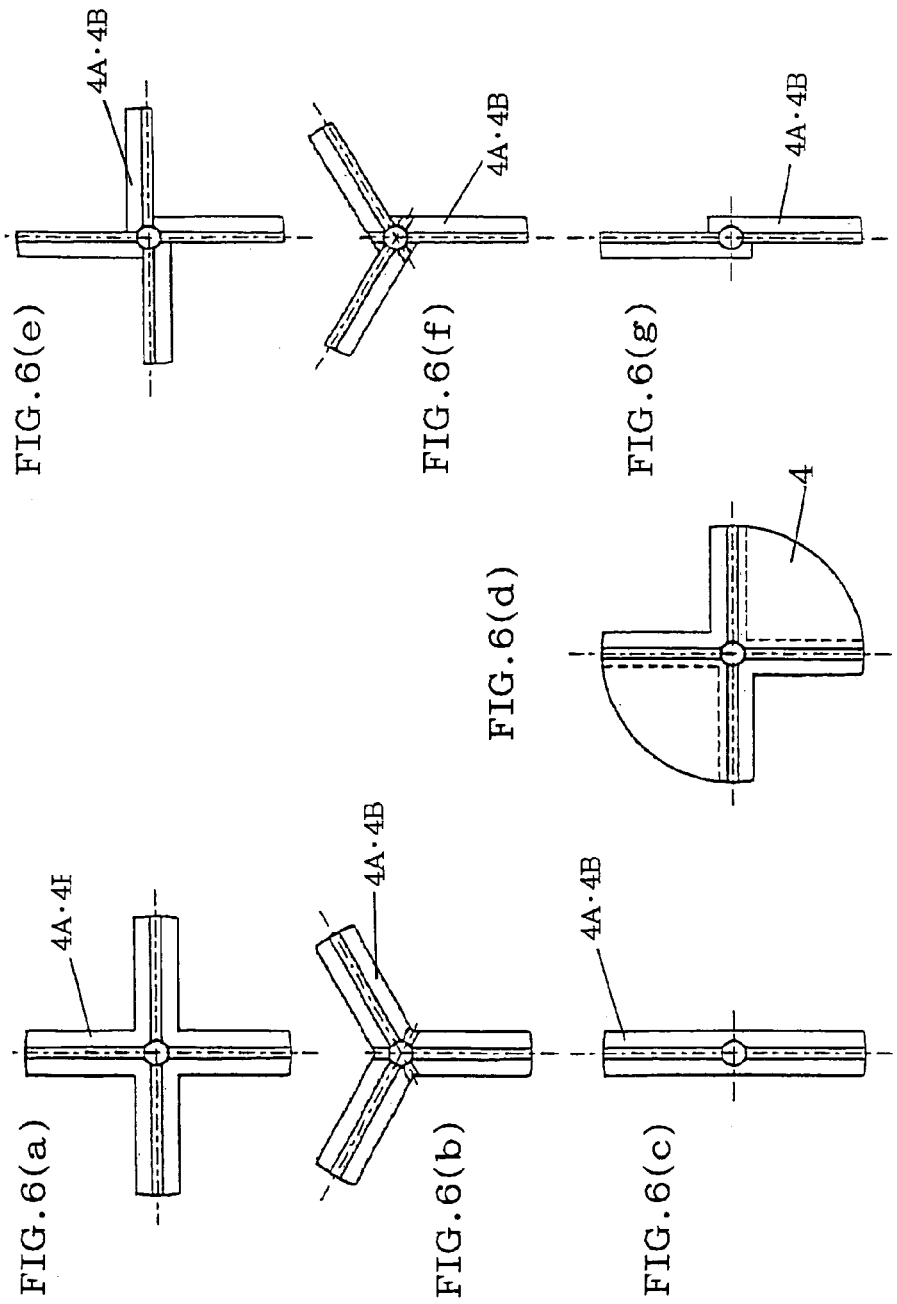
FIGS. 6(a)–6(h) are schematic views showing examples of the collector used for the lithium secondary cell of the present invention.

It is preferable that the positive electrode collector and/or negative electrode collector used in the present invention be of a cross tabular type as shown in FIG. 6A and FIG. 6E, a Y-figured tabular type as shown in FIG. 6B and FIG. 6F or I-figured tabular type as shown in FIG. 6C and FIG. 6G or a circular type with partial notching as shown in FIG. 5, FIG. 6D and FIG. 6H. This makes it possible to check the joint easily, reduce the weight or allow the electrolyte to circulate in the whole body during replenishment of the electrolyte, etc.

When the positive electrode joint of the lithium secondary cell of the present invention is formed, it is preferable that the energy beam 8 be irradiated onto the convex part 7 at an angle θ ($0°<θ≦90°$) with respect to the normal 3A to the plane including the narrow end face 2 of the positive electrode metallic foil 1A, more preferably irradiated at an angle θ ($5°≦θ≦80°$) and particularly preferably irradiated at an angle θ ($10°≦θ≦60°$), and most preferably irradiated at an angle θ ($15°≦θ≦45°$) (FIG. 8). It is also preferable that the energy beam 8 be focused on or close to or around the surface of the convex part 7 of the positive electrode collector 4A and it is preferable that the energy beam 8 not directly be irradiated onto the positive electrode metallic foil 1A.

Furthermore, it is preferable that the positive electrode collector 4A be placed in such a way that the convex part 7 crosses the narrow end face 2 at quasi-right angles and the energy beam 8 be irradiated by scanning the line crossing the narrow end face 2 at quasi-right angles using an energy beam generator, that is, by scanning the convex part 7 of the positive electrode collector 4A. At this time, in addition to the above-described energy beam 8 being irradiated onto the convex part 7 at an angle θ ($0°<θ≦90°$) with respect to the normal 3A to the plane including the narrow end face 2 of the positive electrode metallic foil 1A, it is preferable that the energy beam 8 be irradiated onto the convex part 7 at quasi-right angles with respect to the line crossing the narrow end face 2 at quasi-right angles.

As shown in FIG. 1, this makes it possible to weld the melted body of the positive electrode metallic foil 1A and the positive electrode collector 4A without using brazing filler to join the positive electrode metallic foil 1A and the positive electrode collector 4A. It is also possible to join at least one positive electrode metallic foil 1 with the positive electrode collector 4A by one-time irradiation. Furthermore, since only a predetermined part (convex part 7) of the positive electrode collector 4A can be melted to weld/join the positive electrode metallic foil 1A to the positive electrode collector 4A without causing any damage to the positive electrode metallic foil 1A, it is possible to increase the mechanical strength of the joint.

By the way, the term "joint edges" in the present invention refers to a plurality of edges to be joined in one metallic foil or edges to be joined of the respective metallic foils at a plurality of locations and the term "crossing the narrow end face at quasi-right angles" refers to crossing all the narrow end faces of a plurality of joint edges at quasi-right angles.

When the positive electrode joint of the lithium secondary cell of the present invention is formed, it is preferable that the power density of the energy beam at the irradiation point be 3 kW/mm$^2$ or more, more preferably 4 kW/mm$^2$ or more and most preferably 5 kW/mm$^2$ or more. This is because in the case where the energy beam at the irradiation point is less than 3 kW/mm$^2$, the joint condition is not good and the mechanical strength may be considered insufficient. The upper limit of the power density is not limited to a particular one, but can be determined from the standpoint of prevention of damage to the positive electrode collector or the positive electrode metallic foil connected thereto as appropriate, for example, 60 kW/mm² or less. The term "power density" of energy beam in the present invention refers to a value obtained by dividing the power of the energy beam (kW) by the spot area (mm²) of an irradiation point irradiated with the energy beam in the predetermined part of the positive or negative electrode collector.

Figure 2:
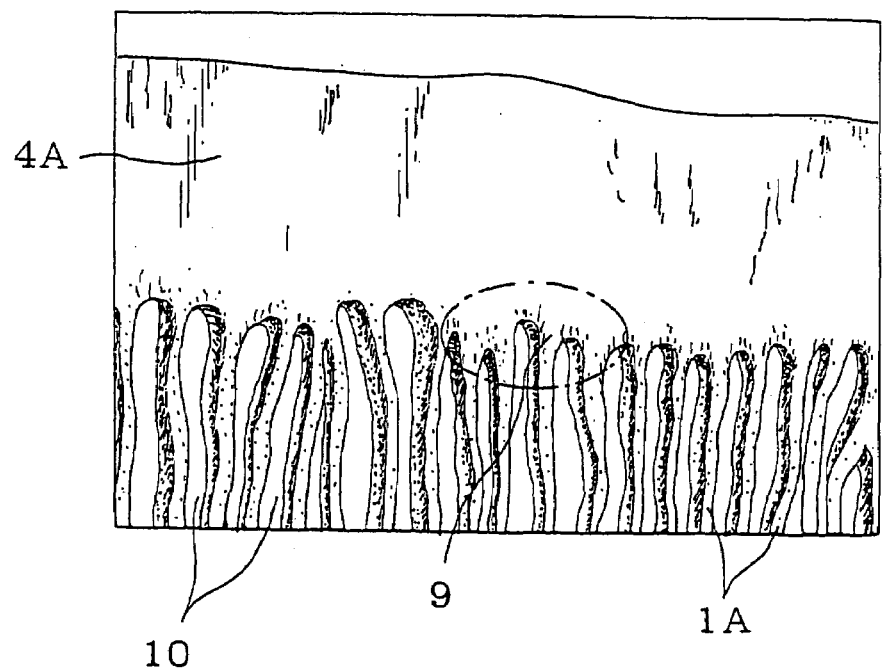
FIG. 2 is a replica diagram showing an example of a current lead-out part where the positive electrode metallic foil and positive electrode collector are joined.

FIG. 2 is a photographic replica diagram showing an example of a joint body joined using an aluminum foil of 20 μm for the positive electrode metallic foil 1A, an aluminum material for the part (convex part) of 2 mm long to be melted by the energy beam in the positive electrode collector 4A and by irradiating a YAG laser.

The example in FIG. 2 shows that the positive electrode metallic foil 1A is welded in such a way that the entire edge is covered with the joint surface 9 of the positive electrode collector 4A, and therefore it is understood that the positive electrode metallic foil 1A is firmly joined to the positive electrode collector 4A.

In this example, neighboring positive electrode metallic foils 1A are arranged with a gap 10 kept in between, but since the shape of the melted body of the predetermined part of the positive electrode collector 4A is maintained on the edges of the positive electrode metallic foils 1A by its surface tension, even if the gap 10 exists, the gap 10 is not immersed and the melted body and the part contacting the edges of the positive electrode metallic foils 1A are joined. By the way, even if some of the plurality of positive electrode metallic foils 1A are arranged contacting one another or all of them are arranged so as to closely contact one another, it is possible to join these foils.

When the negative electrode joint of the lithium secondary cell of the present invention is formed, it is preferable that the energy beam 8 be irradiated onto the convex part 7 at an angle θ (0°≦θ≦30°) with respect to the normal 3B to the plane including the side 13 near the joint edges 15 of the negative electrode metallic foil 1B, more preferably irradiated at an angle θ (0°≦θ≦10°) and most preferably irradiated at an angle θ (0°≦θ≦5°) (FIG. 9). Furthermore, it is preferable that the energy beam 8 be focused onto the surface or around the convex part 7 of the negative electrode collector 4B and it is preferable that the energy beam 8 not be directly irradiated onto the negative electrode metallic foil 1B.

Furthermore, it is preferable that the negative electrode collector 4B be placed in such a way that the convex part 7 crosses the side 13 at quasi-right angles and the energy beam 8 be irradiated by scanning the beam crossing the side 13 at quasi-right angles using an energy beam generator, that is, by scanning the convex part 7 of the negative electrode collector 4B. At this time, in addition to the energy beam 8 being irradiated onto the convex part 7 at an angle θ (0°≦θ≦30°) with respect to the normal 3B to the plane including the side 13 of the negative electrode metallic foil 1B, it is preferable that the energy beam 8 be irradiated onto the convex part 7 at quasi-right angles with respect to the line crossing the side 13 at quasi-right angles.

As shown in FIG. 3, this makes it possible to weld the melted body of the negative electrode metallic foil 1B and the negative electrode collector 4B without using the brazing filler to join the negative electrode metallic foil 1B and the negative electrode collector 4B. It is also possible to join at least one negative electrode metallic foil 1B to the negative electrode collector 4B by one-time irradiation. Furthermore, since only a predetermined part (convex part 7) of the negative electrode collector 4B can be melted to weld/join the negative electrode metallic foil 1B with the negative electrode collector 4B without causing any damage to the negative electrode metallic foil 1B, it is possible to increase the mechanical strength of the joint.

By the way, the term "crossing the side at quasi-right angles" refers to crossing the all the sides near a plurality of joint edges at quasi-right angles.

Furthermore, when the negative electrode joint of the lithium secondary cell of the present invention is formed, it is preferable that the following Expression (7) be satisfied when the thickness of the convex part of the negative electrode collector is $L_2$ (mm) and the power density of the energy beam at the irradiation point is E (kW/mm²) By irradiating the energy beam under conditions that satisfy the following Expression (3), the lithium secondary cell of the present invention suppresses damage to the negative electrode metallic foil and has the special property that the joint has strong mechanical strength.

[Mathematical Expression 3]

$$L_2 \leq E/7 \qquad (3)$$

From the standpoint of suppressing damage to the negative electrode metallic foil and having the special property that the joint has strong mechanical strength, it is preferable that the following Expressions (4) and (5) be satisfied.

[Mathematical Expression 4]

$$L_2 \leq E/9 \qquad (4)$$

[Mathematical Expression 5]

$$L_2 \leq E/10 \qquad (5)$$

With the lithium secondary cell of the present invention, it is preferable that the irradiation point of the energy beam of the negative electrode collector have a flat shape. This suppresses diffused reflection of energy beams and provides the special property of suppressing damage to the negative electrode metallic foil. By the way, from the standpoint of suppressing diffused reflection of energy beams, the flat shape needs only to apply to at least a range wider than the irradiation point.

Furthermore, with the lithium secondary cell of the present invention, it is preferable that the spot diameter of the irradiation point be 1 mm or less. This suppresses irradiation of energy beams onto unnecessary locations and provides the special property of having an optimal joint condition because damage to the negative electrode metallic foil is suppressed. The lithium secondary cell of the present invention is particularly suitable for the case where the neighboring metallic foils are arranged with a certain gap kept in between.

Furthermore, with the present invention, it is preferable that the energy beam 8 shown in FIG. 8 and FIG. 9 be generated by a laser or electron beam having a high energy density and a low heating value and it is also preferable that the energy beam 8 be continuous wave. This allows energy to be irradiated focused on the surface of the convex part 7, making it possible to efficiently melt the convex part 7 and suppress damage to the positive electrode metallic foil 1A or negative electrode metallic foil 1B. Of lasers, a YAG laser is particularly preferable because it can be focused better and the energy density at the position of the positive electrode metallic foil 1A or negative electrode metallic foil 1B placed away from the focus is smaller, making it possible to suppress damage to the positive electrode metallic foil 1A or negative electrode metallic foil 1B better.

Furthermore, when the positive electrode joint of the lithium secondary cell of the present invention is formed, it is preferable that the energy beam 8 in FIG. 8 be irradiated using an energy beam generator capable of continuous irradiation and that the energy beam 8 be irradiated using an energy beam generator capable of scanning the plane parallel to the plane including the narrow end face 2. Furthermore, it is preferable that the scanning speed of the energy beam to be irradiated be 0.1 to 100 m/min, more preferably 1 to 30 m/min and most preferably 2 to 10 m/min. Furthermore, when the predetermined part of the positive electrode collector 4A has the convex part 7, it is preferable that the convex part 7 be irradiated with the energy beam 8 by scanning it using the energy beam generator. Furthermore, with the present invention, it is preferable to provide a plurality of positive electrode collectors 4A according to the number of arranged positive electrode metallic foils 1A and arrange the plurality of positive electrode collectors 4A one after another in such a way that their respective convex parts 7 cross the narrow end face 2 at quasi-right angles. This allows the plurality of positive electrode metallic foils 1A to be joined through one-time irradiation.

On the other hand, when the negative electrode joint of the lithium secondary cell of the present invention is formed, it is preferable that the energy beam 8 shown in FIG. 9 be irradiated using an energy beam generator capable of continuous irradiation and that the energy beam 8 be irradiated using the energy beam generator capable of scanning the plane parallel to the plane including the side 13. Furthermore, when the predetermined part of the negative electrode collector 4B has the convex part 7, it is preferable that the convex part 7 be irradiated with the energy beam 8 by scanning it using the energy beam generator. Furthermore, with the present invention, it is preferable to provide a plurality of negative electrode collectors 4B according to the number of arranged negative electrode metallic foils 1B and arrange the plurality of negative electrode collectors 4B one after another in such a way that their respective convex parts 7 cross the side 13 at quasi-right angles. This allows the plurality of negative electrode metallic foils 1B to be joined through one-time irradiation.

When the positive electrode joint of the lithium secondary cell of the present invention is formed, no joint support material such as brazing filler metal is needed, but of course such a material can be used. In such a case, it is preferable that the joint supplement material to support the joint between the positive electrode collector and positive electrode metallic foil be applied to the positive electrode metallic foil and/or predetermined parts of the positive electrode collector or inserted between the positive electrode metallic foil and the predetermined parts of the positive electrode collector, the predetermined part of the positive electrode collector and joint material be irradiated with an energy beam, melted and the melted predetermined part of the positive electrode collector and joint material be welded to the joint edges of the positive metallic foil.

Furthermore, when the negative electrode joint of the lithium secondary cell of the present invention is formed, no joint support material such as brazing filler metal is needed, but of course such a material can be used. In such a case, it is preferable that the joint supplement material to support the joint between the negative electrode collector and negative electrode metallic foil be applied to the negative electrode metallic foil and/or predetermined parts of the negative electrode collector or inserted between the negative electrode metallic foil and the predetermined parts of the negative electrode collector, the predetermined part of the negative electrode collector and joint material be irradiated with an energy beam, melted and the melted predetermined part of the negative electrode collector and joint material be welded to the joint edges of the negative metallic foil.

More specifically, the present invention is ideally applicable to a wind type or laminate type inner electrode body, and more particularly, to those having a capacity of 2 Ah or more. The use of the cell is not limited to a particular field and is suitable for starting an engine as a large capacity vehicle-mounted battery intended to produce large output by connecting cells in series and requiring space-saving so as to mount multiple cells or for driving a motor of an electric car or hybrid electric car.

Embodiments of the present invention will be explained more specifically below, but the present invention is not limited to these embodiments.

Embodiments 1 to 3, Comparative Examples 1, 2

A joint test is conducted using continuous wave YAG laser as an energy beam and by setting various joint conditions such as the shape of the joint (convex part) of the negative electrode collector, the way to make the negative electrode metallic foil contact the negative electrode collector, the output of the. YAG laser, scanning speed, etc. and the section of the joint body obtained is observed using a microscope. By the way, the metal that constitutes the negative electrode metallic foil and negative electrode collector is copper (JIS C1100). The results are shown in FIG. 21 to FIG. 25.

(Consideration)

When the negative electrode collector and negative electrode metallic foil are joined in good condition, it is possible to observe columnar crystals formed from the negative electrode metallic foil toward the negative electrode collector (Embodiments 1 to 3).

On the other hand, it is not possible to observe any columnar crystals at locations where the negative electrode collector and negative electrode metallic foil are not joined as shown in comparative example 1, and equiaxed crystals can be observed instead.

On the hand, comparative example 2 shows that no columnar crystals are observed but the negative electrode metallic foil and negative electrode collector are joined partially. However, it has been discovered that its joint area is small and the joint is not in stable condition compared to the Embodiments.

As shown above, it has been confirmed that good joint condition can be obtained under conditions under which columnar crystals are formed from the negative electrode metallic foil toward the negative electrode collector at the joint between the negative electrode metallic foil and the negative electrode collector.

As described above by adopting a configuration that electrode plates and collectors are directly joined to lead out a current for the part that leads out a current from the inner electrode body, the present invention can provide a lithium secondary cell with excellent productivity and space-saving capability.

The invention claimed is:

1. A method of making a lithium secondary cell comprising:
   providing an inner electrode body impregnated with a non-aqueous electrolyte, including a positive electrode and a negative electrode each comprising at least one metallic foil wound or laminated together;
   providing a positive electrode collector and a negative electrode collector to lead current out from the inner electrode body, each of said collectors having a protrusion portion that is (i) thicker than remaining parts thereof, (ii) has a lower surface and an opposed upper surface, and (iii) has a width that continuously increases from said lower surface to said upper surface;

arranging predetermined parts of said metallic foil of said positive electrode and predetermined parts of said metallic foil of said negative electrode to contact said protrusion portion of said positive electrode collector and said protrusion portion of said negative electrode collector, respectively;

irradiating said protrusion portion of said positive electrode collector and said protrusion portion of said negative electrode collector with energy beams;

melting at least each said protrusion portion; and forming a weld joint between each said protrusion portion and said predetermined parts of said metallic foils.

2. The method of making a lithium secondary cell according to claim 1, wherein the thickness of said protrusion portion is decreased during the irradiating step.

3. The method of making a lithium secondary cell according to claim 1, further comprising:

providing an electrode cover including internal terminals, external terminals and a cell cover; and connecting said positive electrode collector and/or said negative electrode collector to said internal terminals using electrode leads.

4. The method of making a lithium secondary cell according to claim 1, wherein said predetermined parts of said metallic foil of said positive electrode comprise edges of said foil, and have a thickness that is the same as the thickness of said foil.

5. The method of making a lithium secondary cell according to claim 4, wherein said metallic foil of said positive electrode and said positive electrode collector comprise aluminum or an aluminum alloy.

6. The method of making a lithium secondary cell according to claim 5, wherein said protrusion portion of said positive electrode collector is positioned at a lateral edge of said positive electrode collector.

7. The method of making a lithium secondary cell according to claim 1, wherein said predetermined parts of said metallic foils of said negative electrode comprise sides of said foil, and have a thickness that is greater than the thickness of said foil.

8. The method of making a lithium secondary cell according to claim 7, wherein said metallic foil of said negative electrode and said negative electrode collector comprise copper or a copper alloy.

9. The method of making a lithium secondary cell according to claim 7, wherein said protrusion portion of said negative electrode collector is positioned at a lateral edge of said negative electrode collector.

10. The method of making a lithium secondary cell according to claim 7, further comprising the step of forming said sides of said foil by bending.

11. The method of making a lithium secondary cell according to claim 1, wherein said protrusion portion is convex.

12. The method of making a lithium secondary cell according to claim 1, wherein said each electrode collector is a cross-, Y- or I-figured tabular collector or a circular collector with partial notching.

13. The method of making a lithium secondary cell according to claim 1, wherein each said collector comprises a flat part with said protrusion portion extending therefrom, and said protrusion portion is at least 0.1 mm thicker than said flat part.

14. The method of making a lithium secondary cell according to claim 13, wherein said protrusion portion is at least 0.4 mm thicker than said flat part.

15. The method of making a lithium secondary cell according to claim 14, wherein said protrusion portion is at least 0.6 mm thicker than said flat part.

16. The method of making a lithium secondary cell according to claim 13, wherein said energy beams are irradiated onto said protrusion portion of said positive electrode collector at an angle greater than 0° and no more than 90° with respect to a plane normal to the plane including said flat part.

17. The method of making a lithium secondary cell according to claim 16, wherein the power density of said energy beams at the irradiation point is at least 3 kW/mm$^2$.

18. The method of making a lithium secondary cell according to claim 13, wherein the thickness of said flat part of said negative electrode collector is 0.2 mm or more.

19. The method of making a lithium secondary cell according to claim 18, wherein the thickness of said protrusion portion of said negative electrode collector is 0.4 mm or more.

20. The method of making a lithium secondary cell according to claim 13, wherein said energy beams are irradiated onto said protrusion portion of said negative electrode collector at an angle of 0° to 30° with respect to a plane normal to the plane including said flat part.

21. The method of making a lithium secondary cell according to claim 20, wherein the power density of said energy beams at the irradiation point is at least 6 kW/mm$^2$.

22. The method of making a lithium secondary cell according to claim 21, wherein the thickness (mm) of said protrusion portion is not greater than $\frac{1}{7}$ the power density (kW/mm$^2$) of said energy beams at the irradiation point.

23. The method of making a lithium secondary cell according to claim 22, wherein the spot diameter of said irradiation point is no more than 1 mm.

24. The method of making a lithium secondary cell according to claim 4, wherein said protrusion portion of said positive electrode collector is arranged to cross said edges of said foil at quasi-right angles.

25. The method of making a lithium secondary cell according to claim 7, wherein said protrusion portion of said negative electrode collector is arranged to cross said sides of said foil at quasi-right angles.

26. The method of making a lithium secondary cell according to claim 1, wherein said energy beams are not directly irradiated onto said metallic foil.

27. The method of making a lithium secondary cell according to claim 1, wherein neighboring turns of said metallic foil that do not contact said protrusion portion are placed such that a gap is present therebetween.

28. The method of making a lithium secondary cell according to claim 1, wherein said energy beams comprise a laser or electron beams.

29. The method of making a lithium secondary cell according to claim 28, wherein said energy beams comprise a continuous wave.

30. The method of making a lithium secondary cell according to claim 28, wherein said laser is a YAG laser.

31. The method of making a lithium secondary cell according to claim 1, further comprising the step of arranging a joint material between said predetermined parts of said metallic foil and said predetermined parts of said protrusion portion before said irradiating step.

32. The method of making a lithium secondary cell according to claim 1, further comprising:

providing at least one electrode cover including internal terminals, external terminals and a cell cover, wherein said at least one electrode cover is integral with said positive electrode collector and/or said negative electrode collector.

* * * * *